(12) United States Patent
Chen et al.

(10) Patent No.: US 8,767,961 B2
(45) Date of Patent: Jul. 1, 2014

(54) SECURE LIVE TELEVISION STREAMING

(75) Inventors: Kuang M. Chen, San Diego, CA (US); Paul Moroney, La Jolla, CA (US); John D. Ostrom, La Quinta, CA (US)

(73) Assignee: Motorola Mobility LLC, Chicago, IL (US)

( * ) Notice: Subject to any disclaimer, the term of this patent is extended or adjusted under 35 U.S.C. 154(b) by 166 days.

(21) Appl. No.: 13/342,483

(22) Filed: Jan. 3, 2012

(65) Prior Publication Data

US 2012/0170741 A1 Jul. 5, 2012

Related U.S. Application Data

(60) Provisional application No. 61/430,150, filed on Jan. 5, 2011.

(51) Int. Cl.
*H04N 7/167* (2011.01)

(52) U.S. Cl.
USPC ........................................................ 380/210

(58) Field of Classification Search
USPC ........................................................ 380/210
See application file for complete search history.

(56) References Cited

U.S. PATENT DOCUMENTS

| 8,429,516 | B1 * | 4/2013 | Riggs et al. | 715/201 |
| 2006/0020825 | A1 * | 1/2006 | Grab | 713/193 |
| 2012/0155233 | A1 * | 6/2012 | Spitzlinger et al. | 369/30.09 |

OTHER PUBLICATIONS

Pantos, R. et al.: "HTTP Live Streaming", draft-pantos-http-live-streaming-05, Informational Internet-Draft, Expires May 23, 2011, Apple Inc., Nov. 19, 2010, all pages.

Pantos R et al: "HTTP Live Streaming; draft-pantos-http-live-streaming-04.txt", HTTP Live Streaming; Draft-Pantos-HTTP-Live-Streaming-04.TXT, Internet Engineering Task Force, IETF; Standardworkingdraft, Internet Society (I SOC) 4, Rue Des Falaises CH-1205 Geneva, Switzerland, No. 4, Jun. 6, 2010, pp. 1-22.
Marlin Developer Community: "Marlin Simple Secure Streaming (MS3)", Jul. 7, 2010. XP55022448. Retrieved from the Internet: URL:http://www.marlin-conmunity.com/files/MDC MS3 whitepaper 100707.pdf [retrieved on Mar. 20, 2012] figure 1.
Fecheyr-Lippens A: "A Review of HTTP Live Streaming". Internet Citation. Jan. 25, 2010. pp. 1-37. XP002638990.Retrieved from the Internet: URL:http://issuu.com/andruby/docs/http live streaming— [retrieved on May 24, 2011] pp. 8-15; figure 3.
Intertrust: "Marlin Broadband Architecture Overview", Nov. 5, 2007. XP55022449. Retrieved from the Internet: URL:http://www.marlinconmunity.com/public/MarlinBroadbandArchitectureOverview.pdf [retrieved on Mar. 20, 2012] figures 4.6.
Patent Cooperation Treaty, International Search Report and Written Opinion of the International Searching Authority for International Application No. PCT/US2012/020132, Mar. 30, 2012, 14 pages.

* cited by examiner

*Primary Examiner* — Teshome Hailu
*Assistant Examiner* — Abiy Getachew (57) ABSTRACT

A client device implements a media player and a proxy application. The media player controls playback of media content on the client device. The proxy application is implemented to request a playlist from a media server, where the playlist corresponds to the media content. The proxy application receives the playlist from the media server, and the playlist includes encryption key reference parameters to obtain an encryption key. The proxy application modifies the playlist to include local encryption key access parameters for the media player, and the modified playlist is communicated to the media player. The proxy application can then receive a request for the encryption key from the media player that utilizes the local encryption key access parameters included in the modified playlist, and the proxy application securely communicates the encryption key to the media player.

20 Claims, 5 Drawing Sheets

Secure Live Television Streaming

FIG. 5

SECURE LIVE TELEVISION STREAMING

CROSS-REFERENCE TO RELATED APPLICATIONS

This application claims priority to U.S. Provisional Patent Application 61/430,150, filed on Jan. 5, 2011, the disclosure of which is incorporated by reference herein in its entirety.

FIELD OF THE INVENTION

The present invention is related to digital television.

BACKGROUND OF THE INVENTION

The traditional notion of watching television at home has evolved into many different forms of viewing television content, on many different devices. For example, users can watch television content, such as live television, recorded television, and time-shifted programs and movies on various devices, such as televisions, display devices, entertainment devices, computers, and even mobile devices, such as tablets and mobile phones. However, television content that is viewed on a mobile device, such as a tablet or mobile phone, is primarily content that is either stored on the device or already recorded content that can be streamed to the device without interruption. There are challenges to streaming live television for viewing on a mobile device. HTTP Live Streaming (HLS) can be utilized for live streaming applications. HLS supports secure delivery of media content via stream encryption where an encryption key is obtained via an HTTP (Hypertext Transfer Protocol) Uniform Resource Locator (URL). However, other than using HTTP Secure (HTTPS) to obtain an encryption key from a server, conventional HLS does not address how to protect the key-fetching process.

BRIEF SUMMARY

The above considerations, and others, are addressed by the present invention, which can be understood by referring to the specification, drawings, and claims. According to aspects of the present invention, a client device implements a media player and a proxy application. The media player controls playback of media content on the client device. The proxy application is implemented to request a playlist from a media server, where the playlist corresponds to the media content. The proxy application receives the playlist from the media server, and the playlist includes encryption key reference parameters to obtain an encryption key. The proxy application modifies the playlist to include local encryption key access parameters for the media player, and the modified playlist is communicated to the media player. The proxy application can then receive a request for the encryption key from the media player that utilizes the local encryption key access parameters included in the modified playlist, and the proxy application securely communicates the encryption key to the media player.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

In various embodiments, secure live television streaming utilizes HLS to protect and securely deliver encryption keys for media content playback. For example, a client device, such as a mobile phone, tablet device, or portable computer, can include a media player that controls playback of media content, such as live television, on the client device. The client device also implements a proxy application between the media player and a media content server that delivers the streaming media content to the client device. The proxy application is implemented to protect encryption key acquisition, as well as authentication of the media player in the client device. In an embodiment, HLS encryption key delivery is secured and is independent of the key security system that may be utilized to obtain the encryption key. The proxy application is implemented to enable secure delivery of the encryption key to the media player, which then utilizes the encryption key to decrypt and playback encrypted media content received from the media server.

In some embodiments, the proxy application is implemented to request a playlist from the media server, where the playlist corresponds to the media content that is requested for playback at the client device by the media player. The proxy application receives the playlist from the media server, and the playlist includes encryption key reference parameters to obtain the encryption key. The encryption key may have been previously received, may be derived locally, or can be requested from a key server. The proxy application modifies the playlist to include local encryption key access parameters for the media player, and the modified playlist is communicated to the media player. The proxy application can then receive a request for the encryption key from the media player that utilizes the local encryption key access parameters included in the modified playlist, and the proxy application securely communicates the encryption key to the media player.

While features and concepts of secure live television streaming can be implemented in any number of different devices, systems, networks, or configurations, embodiments of secure live television streaming are described in the context of the following example devices, systems, and methods.

Figure 1:
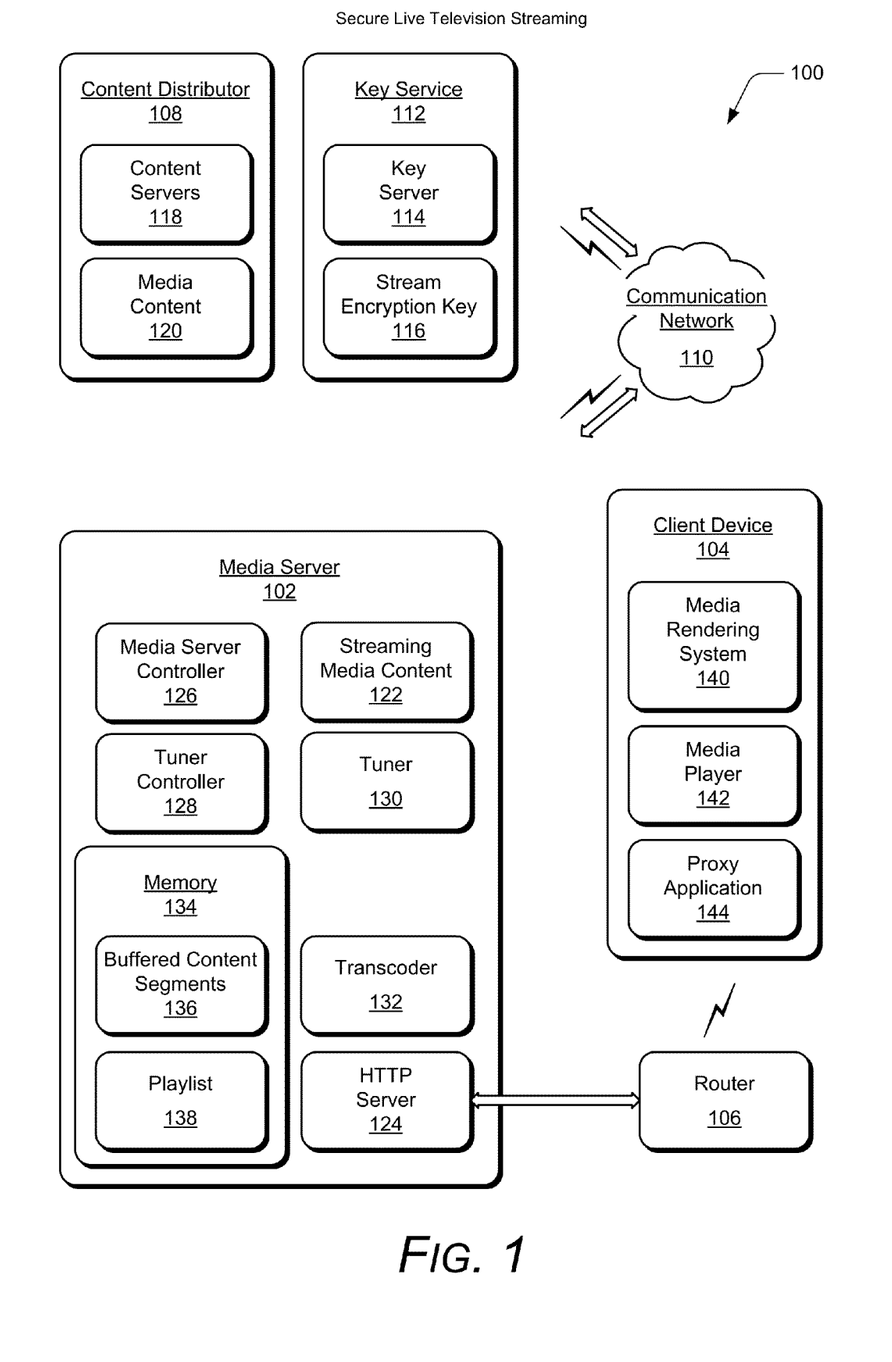
FIG. 1 illustrates an example system in which embodiments of secure live television streaming can be implemented.

FIG. 1 illustrates an example system 100 in which embodiments of secure live television streaming can be implemented. The example system 100 includes a media server 102 that is implemented to communicate streaming media content, such as streaming live television, to a client device 104 via a router 106, such as in a home or business environment. The example system 100 also includes a content distributor 108 or other video content sources that deliver media content and data to any number of various devices via a communication network 110. The example system 100 also includes a key service 112, such as any key encryption service or key service provider, that implements a key server 114 to distribute a stream encryption key (SEK) 116 for secure delivery of streaming media content from a media server 102 to a media player at a client device 104. In implementations, playback of the streaming media content at the client device 104 is not dependent on a particular key server 114, and different key servers 114 or services 112 may be utilized.

Any of the services, devices, and servers described herein can communicate via the communication network 110, which can be implemented to include a wired or a wireless network. The communication network 110 can also be implemented using any type of network topology or communication protocol, and can be represented or otherwise implemented as a combination of two or more networks, to include IP-based networks or the Internet. The communication network 10 may also include mobile operator networks that are managed by a mobile network operator or other network operators, such as a communication service provider, cell-phone provider, or Internet service provider.

The content distributor 108 includes content servers 118 to distribute media content 120 to the media server 102, such as streaming live television that is distributed via a coaxial cable system or IP-based system. The streaming media content can include any type of audio, video, or image data in the form of television programming, movies, on-demand video, interactive games, advertisements, and the like. The content distributor 108, key service 112, or the respective servers 118, 114 can be implemented with various components, such as a processor and memory devices, as well as with any combination of differing components as further described with reference to the example electronic device shown in FIG. 5. For example, the content distributor 108 and the key service 112 include storage media, such as any type of memory or suitable electronic data storage, to store or otherwise maintain the video content and other data.

The media server 102 receives the streaming media content 122 from the content distributor 108, and an HTTP server 124 is implemented to communicate the streaming media content 122, such as streaming live television, to the client device 104 via the router 106. The media server 102 can be implemented with various components, such as a processor and memory devices, as well as with any combination of differing components as further described with reference to the example electronic device shown in FIG. 5. The media server 102 includes a media server controller 126 that is implemented to control the media server 102 and communication with the various servers and devices.

In this example, the media server 102 also includes a tuner controller 128, a tuner 130, and a transcoder 132. The tuner controller 128 can receive an input from the client device 104 to request media content or to switch media content, such as when a user is watching a television program on the client device 104 and then initiates a channel change. The tuner 130 tunes to the television channel frequency that correlates to the channel change input, and the transcoder 132 then decrypts and transcodes the streaming media content 122. The transcoder 132 may also be implemented with a cryptography module (MCard) to implement cryptography, as well as decryption and re-encryption of video services.

The media server 102 includes memory 134 that can be implemented as a memory buffer for buffered content segments 136 of the streaming media content 122 that is transcoded and maintained for delivery to the client device 104. The memory 134 also maintains a playlist 138 that identifies segment files of the buffered content segments 136. When a media-content request, such as a television channel change input, is received from the client device 104, the tuner 130 is tuned, and the transport for the selected media content is acquired, decrypted, transcoded, segmented, and encrypted for streaming to the client device 104. The process can be implemented using HLS, in which case the media content segments are listed in the playlist 138.

The client device 104 may be implemented as any one or combination of a communication, computer, media playback, gaming, entertainment, or electronic device, such as a mobile phone or tablet device, that can be configured as a television client device to receive and playback media content. The client device 104 can be implemented with various components, such as a processor and memory devices, as well as with any combination of differing components as further described with reference to the example electronic device shown in FIG. 5. For example, the client device 104 includes a media rendering system 140 to playback media content for viewing on an integrated display device. The client device 104 can also include various client applications, such as a media player 142 that is implemented to manage the media content playback, as well as a proxy application 144 that can be implemented as computer-executable instructions, such as a software application, and executed by one or more processors, to implement the various embodiments of secure live television streaming described herein.

In some embodiments, the proxy application 144 is implemented to enable secure delivery of an encryption key to the media player 142 at the client device 104, independent of the media server 102 obtaining the encryption key. The proxy application 144 protects access to the encryption key via two-way authentication and externalizes the key-server interface, making it possible to use different key servers. The proxy application 144 runs between the media player 142 in the client device 104 and external servers of the streaming media content, such as the media server 102. The media server 102 can deliver encrypted media content to the media player 142 in the client device 104 utilizing HLS, and the media content is encrypted with the SEK. In some implementations, the media server 102 and the key server 114 may be implemented together in the same device, yet maintain the distinct roles described herein for encryption key request and reply messages.

In some embodiments, the proxy application 144 instantiates the media player 142 with an obfuscated URL. The media player 142 can determine the local host (e.g., the proxy application 144) for its encryption key, when the playlist or a modified playlist includes key Uniform Resource Identifiers under a domain name for which a provider of the system 100 has acquired a valid trusted certificate. This domain name is translated under DNS to local host. Further, the proxy application 144 and the media player 142 authenticate each other in the system. Alternatively, the media player 142 can be implemented to authenticate the proxy application 144 without the proxy application 144 authenticating the media player 142. In an alternate embodiment, the media player 142 can be implemented to request a playlist from the media server 102 directly, bypassing the proxy application 144 without an obfuscated URL.

Figure 2:
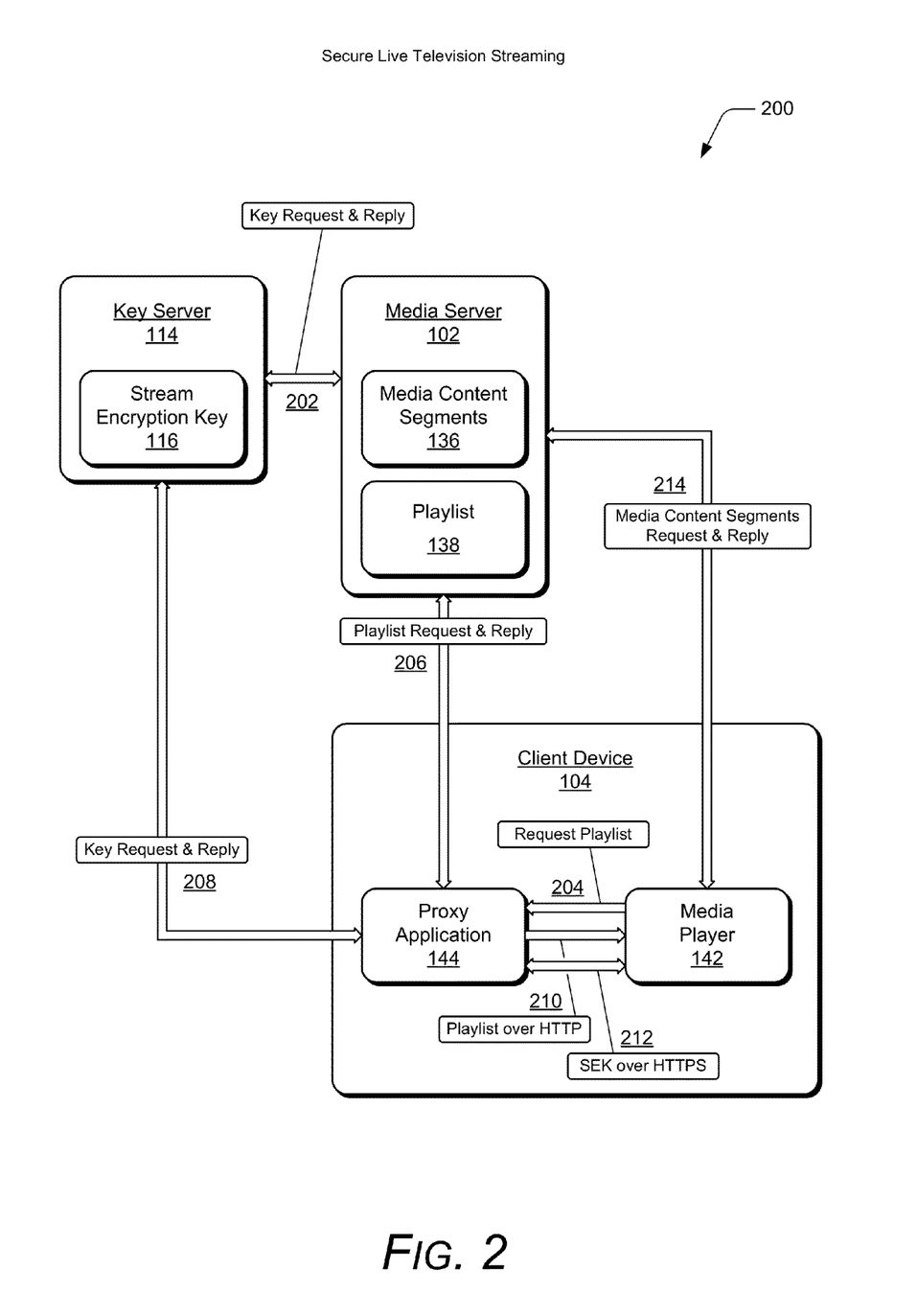
FIG. 2 illustrates an example of data communications among various devices, applications, and servers in accordance with one or more embodiments and with reference to the example system shown in FIG. 1.

FIG. 2 illustrates an example 200 of data communications between the devices and components described with reference to the example system 100 shown in FIG. 1 to implement embodiments of secure live television streaming as implemented using HLS. The data communications between the devices and components are further detailed as described with reference to FIG. 3.

In this example 200, the media server 102 initiates a request for an encryption key at 202, and the key server 114 returns the SEK 116 to the media server 102. In response to a user request for media content, the media player 142 initiates a request at 204 for the playlist 138 from the proxy application 144. The proxy application 144 then initiates a request for the playlist 138 at 206, and the media server 102 returns the playlist 138 to the proxy application 144. The proxy application 144 is implemented to determine encryption key reference parameters from the playlist 138 as provided by the media server 102 in the playlist 138. The proxy application 144 then initiates a request for the encryption key at 208 based on the encryption key reference parameters, and the key server 114 returns the stream encryption key 116 to the proxy application 144. In one implementation, the media server 102 lists in the playlist 138 that the location of the encryption key is at the proxy application 144, in which case the proxy application 144 does not need to then translate the playlist 138 to insert the location of the encryption key, and the media player 142 can obtain the playlist 138 independently.

The proxy application 144 is implemented to modify the playlist 138 to localize the encryption key access parameters in the playlist for the media player 142. The proxy application 144 is implemented to modify the playlist by replacing the HTTP protocol with HTTPS, substitute a URL of the playlist to redirect an HTTPS request for the encryption key to the proxy application 144, and obfuscate the substituted URL to the proxy application 144, where the substituted URL includes a unique, randomly-generated key URL. The proxy application 144 then communicates the modified playlist at 210 to the media player 142. The media player 142 can then initiate an HTTPS request at 212 based on the local encryption key access parameters received in the playlist from the proxy application 144, and the proxy application 144 returns the SEK to the media player 142. The media player 142 can then request the encrypted media content directly from the media server 102 at 214, and the media server 102 returns the encrypted media content segments 136 for playback of the media content at the client device 104.

Figure 3:
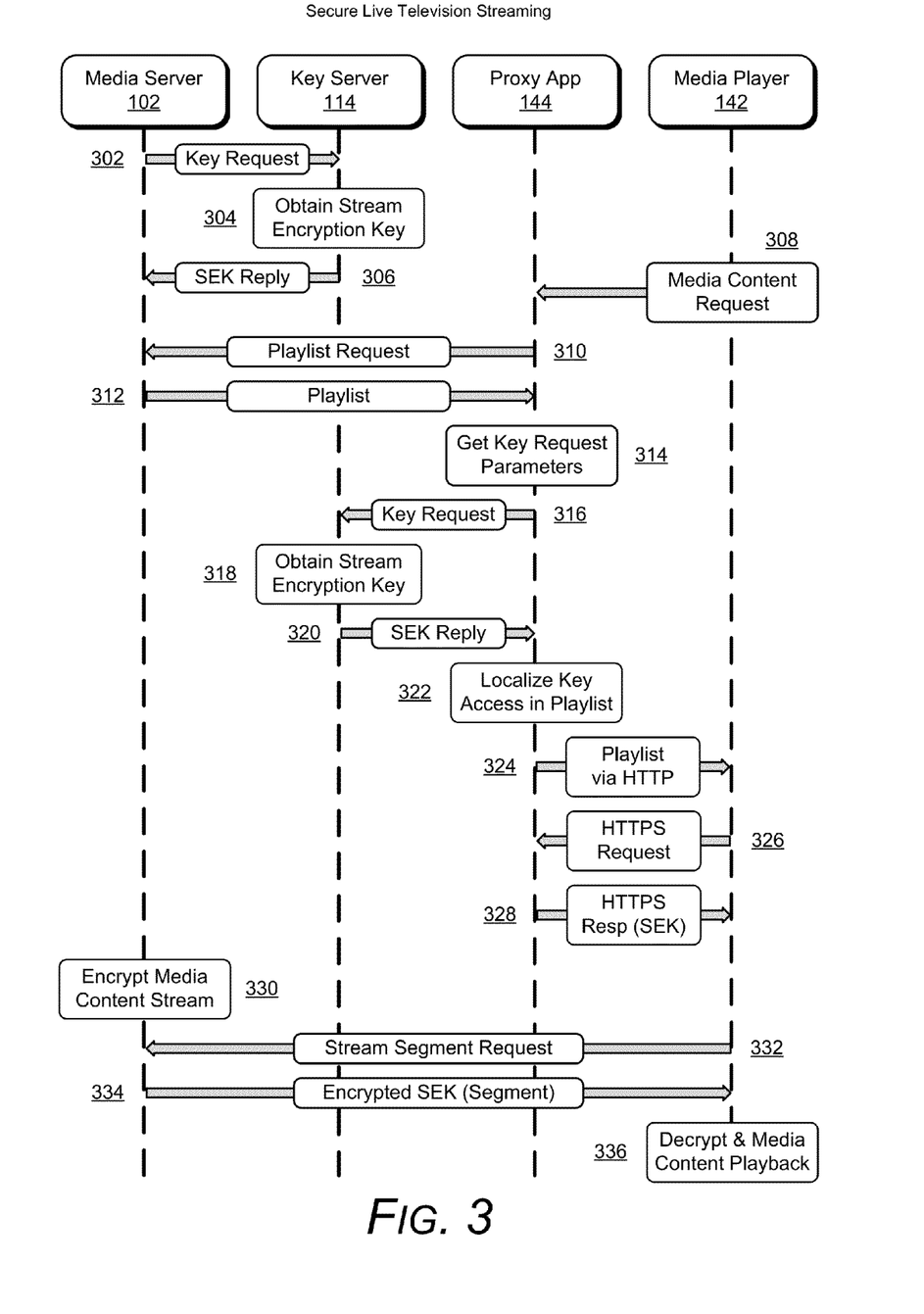
FIG. 3 further illustrates the example data communications among the various devices, applications, and servers in accordance with one or more embodiments.

FIG. 3 further details the data communication between the devices and components of the example system shown in FIGS. 1 and 2 for secure live television streaming implemented using HLS. With reference to 202 (FIG. 2) for the encryption key request and reply, the media server 102 initiates the request to the key server 114 for the encryption key at 302. The key server 114 receives the request and obtains the SEK at 304. In some implementations, the key server 114 generates the SEK, or alternatively, requests the SEK from a key management system. The key server 114 then communicates the SEK to the media server 102 at 306.

With reference to the initial playlist request at 204, the media player 142 receives a user request for media content and communicates the playlist request at 308 to the proxy application 144. With reference to 206 for the playlist request and reply, the proxy application 144 communicates the request for the playlist 138 to the media server 102 at 310. The media server 102 then communicates the playlist 138 to the proxy application 144 at 312. The proxy application 144 is implemented to determine the encryption key reference parameters from the playlist 138 at 314.

With reference to 208 for the encryption key request and reply, the proxy application 144 initiates the request to the key server 114 for the SEK 116 at 316 based on the encryption key reference parameters determined from the playlist 138. The key server 114 receives the request from the proxy application 144, obtains the SEK 116 at 318, and then communicates the SEK 116 to the proxy application 144 at 320. The proxy application 144 is implemented to modify the playlist at 322 to localize the key access parameters in the playlist. With reference to 210, the proxy application 144 then communicates the modified playlist to the media player 142 at 324.

With reference to 212 for the HTTPS request and SEK 116 reply, the media player 142 can initiate the HTTPS request at 326 based on the local encryption key access parameters received in the playlist from the proxy application 144. The proxy application 144 then returns the SEK 116 over HTTPS to the media player 142 at 328. The media content stream is encrypted at 330 at the media server 102. With reference to 214 for the media content segments request and reply, the media player 142 requests the encrypted media content directly from the media server 102 at 332, and the media server 102 returns the encrypted media content segments 136 to the media player 142 at 334 for decryption and playback at 336.

Example method 400 is described with reference to FIG. 4 in accordance with one or more embodiments of secure live television streaming. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local or remote to a computer processor. The methods may also be practiced in a distributed computing environment by multiple computer devices. Further, the features described herein are platform-independent and can be implemented on a variety of computing platforms having a variety of processors.

Figure 4:
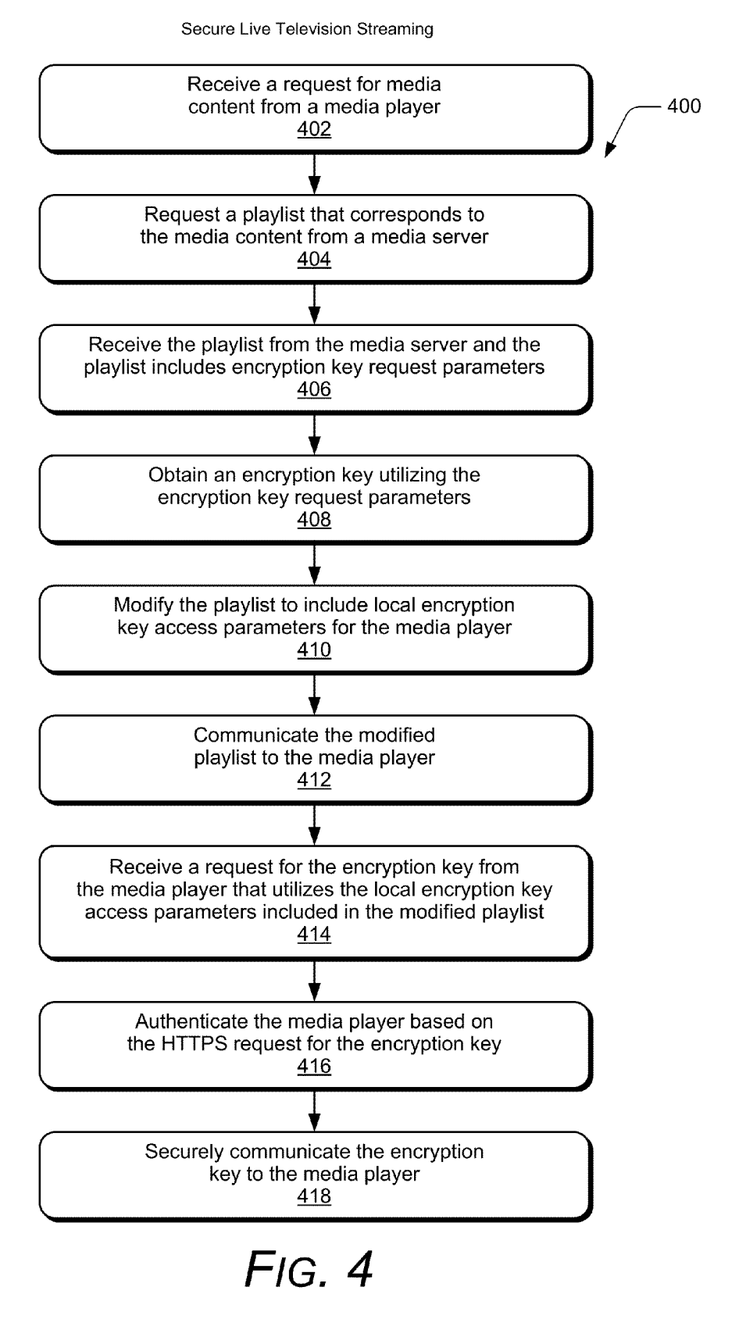
FIG. 4 illustrates an example method of secure live television streaming in accordance with one or more embodiments.

FIG. 4 illustrates an example method 400 of secure live television streaming. The order in which the method blocks are described is not intended to be construed as a limitation, and any number or combination of the described method blocks can be combined in any order to implement a method or an alternate method.

At block 402, a request for media content is received from a media player. For example, the media player 142 at the client device 104 (FIG. 1) receives a user request for media content or to switch media content, such as for streaming live television when a user is watching a television program on the client device 104 and initiates a channel change. At block 404, a playlist that corresponds to the media content is requested from a media server. For example, the proxy application 144 at the client device 104 requests the playlist 138 from the media server 102, where the playlist 138 corresponds to the requested media content.

At block 406, the playlist is received from the media server and the playlist includes encryption key reference parameters. For example, the proxy application 144 at the client device 104 receives the playlist 138 from the media server 102, and the playlist 138 includes encryption key reference parameters that the proxy application 144 can utilize to obtain an encryption key. In some implementations, such as for streaming live television, the encryption key is an SEK or a derived encryption key.

At block 408, an encryption key is obtained utilizing the encryption key reference parameters. For example, the encryption key may have been previously received, can be derived locally, or can be requested from a key server, in which case the proxy application 144 at the client device 104 requests the encryption key 116 from the key server 114 at the key service 112 and receives the encryption key 116 from the key server 114.

At block 410, the playlist is modified to include local encryption key access parameters for the media player. For example, the proxy application 144 at the client device 104 modifies the playlist 138 to generate a modified playlist, which includes: replacing HTTP protocol with HTTPS, substituting a URL of the playlist to redirect an HTTPS request for the encryption key to the proxy application 144, and obfuscating the substituted URL to the proxy application 144, and the substituted URL includes a unique, randomly-generated key URL.

At block 412, the modified playlist is communicated to the media player. For example, the proxy application 144 at the client device 104 communicates the modified playlist to the media player 142. At block 414, a request for the encryption key is received from the media player that utilizes the local encryption key access parameters included in the modified playlist. For example, the proxy application 144 at the client device 104 receives an HTTPS request for the encryption key from the media player 142. At block 416, the media player is authenticated based on the HTTPS request for the encryption key. For example, the proxy application 144 at the client device 104 authenticates the media player 142 based on the HTTPS request for the encryption key.

At block 418, the encryption key is securely communicated to the media player. For example, the proxy application 144 at the client device 104 securely communicates the encryption key to the media player 142 as an HTTPS response. The media player 142 can then receive the media content encrypted from the media server 102 and utilize the encryption key to decrypt and playback the encrypted media content.

Figure 5:
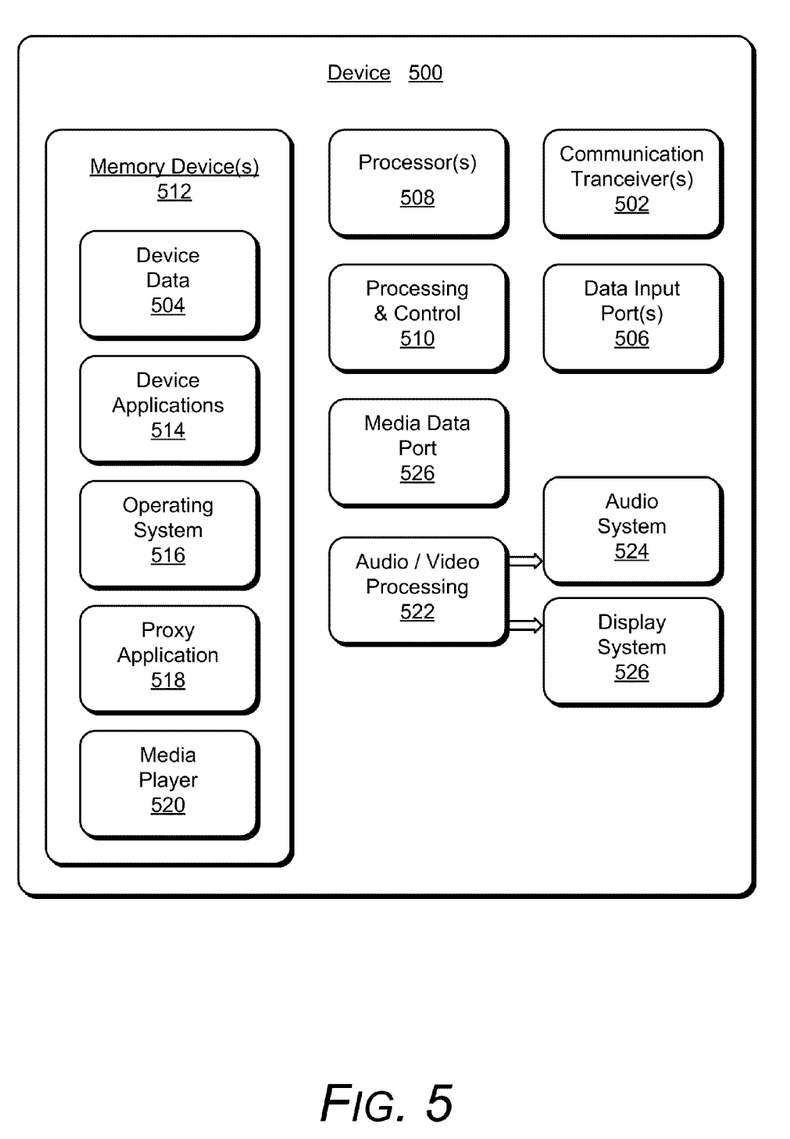
FIG. 5 illustrates various components of an example electronic device that can implement embodiments of secure live television streaming.

FIG. 5 illustrates various components of an example electronic device 500 that can be implemented as any device described with reference to any of the previous FIGS. 1 through 4. In some embodiments, the electronic device 500 may be implemented as a media server 102 or a client device 104, such as described with reference to FIG. 1. Alternatively or in addition, the electronic device 500 may be implemented in any form of device that can receive and playback streaming video content, such as any one or combination of a communication, computer, media playback, gaming, entertainment, mobile phone, or tablet computing device.

The electronic device 500 includes communication transceivers 502 that enable wired or wireless communication of device data 504, such as received data, data that is being received, data scheduled for broadcast, data packets of the data, etc. Example transceivers include wireless personal area network radios compliant with various IEEE 802.15 standards, wireless local area network radios compliant with any of the various IEEE 802.11 standards, wireless wide area network radios for cellular telephony, wireless metropolitan area network radios compliant with various IEEE 802.15 standards, and wired local area network Ethernet transceivers.

The electronic device 500 may also include one or more data input ports 506 via which any type of data, media content, or inputs can be received, such as user-selectable inputs, messages, music, television content, recorded video content, and any other type of audio, video, or image data received from any content or data source. The data input ports 506 may include USB ports, coaxial cable ports, and other serial or parallel connectors (including internal connectors) for flash memory, DVDs, CDs, and the like. These data input ports 506 may be used to couple the electronic device 500 to components, peripherals, or accessories such as microphones or cameras.

The electronic device 500 includes one or more processors 508 (e.g., any of microprocessors, controllers, and the like), which process computer-executable instructions to control operation of the device 500. Alternatively or in addition, the electronic device 500 can be implemented with any one or combination of software, hardware, firmware, or fixed-logic circuitry that is implemented in connection with processing and control circuits, which are generally identified at 510. Although not shown, the electronic device 500 can include a system bus or data transfer system that couples the various components within the device 500. A system bus can include any one or combination of different bus structures, such as a memory bus or memory controller, a peripheral bus, a universal serial bus, or a processor or local bus that utilizes any of a variety of bus architectures.

The electronic device 500 also includes one or more memory devices 512 that enable data storage, examples of which include random access memory, non volatile memory (e.g., read-only memory, flash memory, EPROM, EEPROM, etc.), and a disk storage device. A disk storage device may be implemented as any type of magnetic or optical storage device, such as a hard disk drive, a recordable or rewriteable disc, any type of a digital versatile disc, and the like. The electronic device 500 may also include a mass storage media device.

A memory device 512 provides data storage mechanisms to store the device data 504, other types of information or data, and various device applications 514 (e.g., software applications). For example, an operating system 516 can be maintained as software instructions within a memory device 512 and executed on the processors 508. The device applications 514 may also include a device manager, such as any form of a control application, software application, signal-processing and control module, code that is native to a particular device 500, a hardware abstraction layer for a particular device 500, and so on. The electronic device 500 may also include a proxy application 518 and a media player 520, such as for a client device, to implement embodiments of secure live television streaming.

The electronic device 500 also includes an audio or video processing system 522 that generates audio data for an audio system 524 or generates display data for a display system 526. The audio system 524 or the display system 526 may include any devices that process, display, or otherwise render audio, video, display, or image data. Display data and audio signals can be communicated to an audio component or to a display component via a radio-frequency link, S-video link, high-definition multimedia interface, composite video link, component video link, digital video interface, analog audio connection, or other similar communication link, such as media data port 526. In some implementations, the audio system 524 or the display system 526 includes external components to the electronic device 500. Alternatively, the audio system 524 or the display system 526 includes integrated components of the example electronic device 500.

Although embodiments of secure live television streaming have been described in language specific to features or methods, the subject of the appended claims is not necessarily limited to the specific features or methods described. Rather, the specific features and methods are disclosed as example implementations of secure live television streaming.

We claim:

1. A method comprising:
   receiving a request for media content from a media player;
   requesting a playlist that corresponds to the media content from a media server;
   receiving the playlist from the media server, the playlist including encryption key reference parameters;
   obtaining an encryption key utilizing the encryption key reference parameters;
   modifying the playlist to include local encryption key access parameters for the media player;
   communicating the modified playlist to the media player;
   receiving a request for the encryption key from the media player that utilizes the local encryption key access parameters included in the modified playlist; and
   communicating the encryption key to the media player.

2. The method as recited in claim 1 wherein the media player receives the media content encrypted from the media server and utilizes the encryption key to decrypt and playback the media content.

3. The method as recited in claim 1 wherein said obtaining the encryption key includes one of: determining that the encryption key was previously received, deriving the encryption key locally, or requesting the encryption key from a key server utilizing the encryption key reference parameters.

4. The method as recited in claim 1 wherein the encryption key is securely delivered independently to the media server and to the media player.

5. The method as recited in claim 1 wherein said modifying the playlist includes:
   replacing HTTP protocol with HTTP Secure (HTTPS); and
   substituting a URL of the playlist to redirect an HTTPS request for the encryption key to a proxy application.

6. The method as recited in claim 5 wherein said modifying the playlist further includes:
   obfuscating the substituted URL to the proxy application, the substituted URL including a unique, randomly-generated key URL.

7. The method as recited in claim 5:
   wherein the request for the encryption key from the media player is received as an HTTPS request;
   wherein authenticating the media player is based on the HTTPS request for the encryption key; and
   wherein the encryption key is communicated to the media player with an HTTPS response.

8. The method as recited in claim 1 wherein the media content is streaming live television, and wherein the encryption key is one of a stream encryption key or a derived encryption key that is utilized by the media player to decrypt and playback the media content.

9. A client device comprising:
   a media player configured to control playback of media content on the client device; and
   a memory and a processor to implement a proxy application configured to:
   request a playlist from a media server, the playlist corresponding to the media content;
   receive the playlist from the media server, the playlist including encryption key reference parameters to obtain an encryption key;
   modify the playlist to include local encryption key access parameters for the media player;
   communicate the modified playlist to the media player;
   receive a request for the encryption key from the media player that utilizes the local encryption key access parameters included in the modified playlist; and
   securely communicate the encryption key to the media player.

10. The client device as recited in claim 9 wherein the media server and the proxy application are configured to independently receive the encryption key, and wherein the encryption key is securely delivered to the media player via two-way authentication between the media player and the proxy application.

11. The client device as recited in claim 9 wherein the media player is further configured to:
    request the media content from the media server;
    receive the media content encrypted from the media server; and
    utilize the encryption key to decrypt and playback the media content.

12. The client device as recited in claim 9 wherein the proxy application is further configured to:
    replace HTTP protocol with HTTP Secure (HTTPS) to said modify the playlist;
    substitute a URL of the playlist to redirect an HTTPS request for the encryption key to the proxy application; and
    obfuscate the substituted URL to the proxy application, the substituted URL including a unique, randomly-generated key URL.

13. The client device as recited in claim 12 wherein the proxy application is configured to:
    receive the request for the encryption key from the media player as an HTTPS request; and
    securely communicate the encryption key to the media player with an HTTPS response.

14. The client device as recited in claim 13 wherein the proxy application is further configured to authenticate the media player based on the HTTPS request for the encryption key.

15. A method comprising:
    requesting a playlist from a media server, the playlist corresponding to streaming media content that is encrypted by the media server;
    receiving the playlist from the media server, the playlist including encryption key reference parameters to obtain a stream encryption key;
    modifying the playlist to include local encryption key access parameters for a media player;
    communicating the modified playlist to the media player;
    receiving a request for the stream encryption key from the media player that utilizes the local encryption key access parameters included in the modified playlist; and
    communicating the encryption key to the media player.

16. The method as recited in claim 15 further comprising:
    authenticating the media player based on the request for the stream encryption key from the media player; and
    securely delivering the stream encryption key to the media player.

17. The method as recited in claim 15 wherein the media player receives the encrypted, streaming media content encrypted from the media server and utilizes the stream encryption key to decrypt and playback the streaming media content.

18. The method as recited in claim 15 wherein said modifying the playlist includes:
    replacing HTTP protocol with HTTP Secure (HTTPS); and
    substituting a URL of the playlist to redirect an HTTPS request for the stream encryption key to a proxy application.

19. The method as recited in claim 18 wherein said modifying the playlist further includes:
   obfuscating the substituted URL to the proxy application, the substituted URL including a unique, randomly-generated key URL.

20. The method as recited in claim 18:
   wherein the request for the stream encryption key from the media player is received as an HTTPS request; and
   wherein the stream encryption key is communicated to the media player with an HTTPS response.

* * * * *